Sept. 10, 1946.        J. E. CHAPMAN                 2,407,537
                   POWER OPERATED ACTUATOR
                    Filed May 13, 1944            2 Sheets-Sheet 1
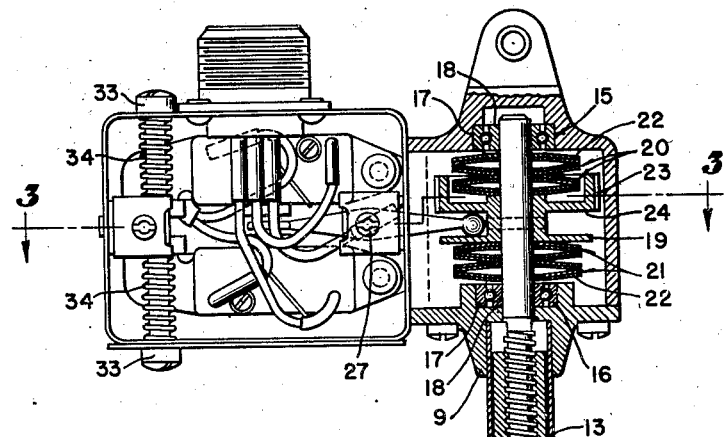
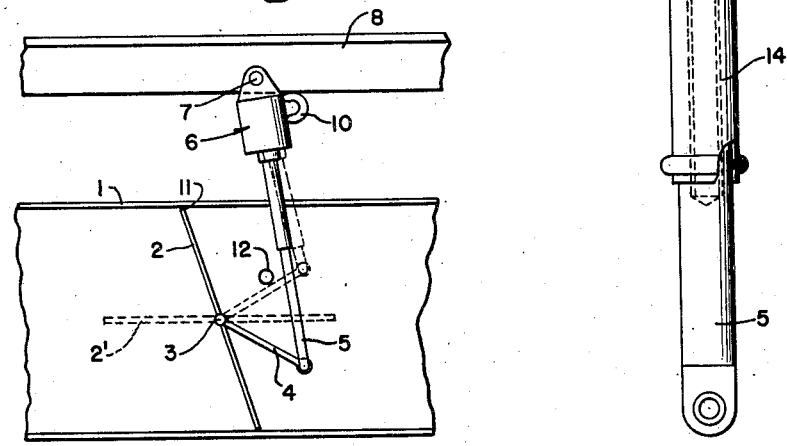
INVENTOR.
JAMES E. CHAPMAN
BY
ATTORNEY Sept. 10, 1946.   J. E. CHAPMAN   2,407,537
POWER OPERATED ACTUATOR
Filed May 13, 1944   2 Sheets-Sheet 2

INVENTOR.
JAMES E. CHAPMAN
BY
ATTORNEY

Patented Sept. 10, 1946

2,407,537

UNITED STATES PATENT OFFICE 2,407,537

POWER OPERATED ACTUATOR

James E. Chapman, Phoenix, Ariz., assignor to The Garrett Corporation, Los Angeles, Calif., a corporation of California Application May 13, 1944, Serial No. 535,533

9 Claims. (Cl. 192—142)

My invention relates to a power operated unitary device which may be connected between a support and a member which is to be moved back and forth between selected positions of operation and which may be operated to perform the function of moving the part positively and consistently into the positions which have been predetermined therefor. Although the invention is of general utility for the moving of mechanical parts, it is especially adapted for movement of parts on an aircraft which must be brought accurately into a selected position of operation. For example, the device has extensive use as a means for moving flaps which serve as shutters or valves for an air passage and as a means for moving butterfly valve members within ducts or air passages, and for the purpose of simplifying this disclosure, the invention will be explained with relation to this use thereof.

It is an object of the invention to provide an actuator unit having a power means such as an electric motor and a transmission mechanism whereby this power means accomplishes movement of a part accurately into a selected position of operation which is determined by a stop. Power driven actuators of this type have been made having limit switches for the motor so that the movable part of the actuator is stopped in a definite position. This means that the actuator must be very carefully adjusted with relation to the parts to be moved so that the movable part of the actuator will stop in a position to bring the valve or other member to which it is connected to its required position, and where an actuator of this type has been carefully adjusted, trouble has resulted from the coasting of the motor after the opening of the associated limit switch so as to either carry the moved member beyond its required position or place the structure under heavy strain or even injure the same.

It is an object of the invention to provide a motor driven actuator of this character wherein the power means is operated after the moved part has been brought into its desired position and wherein the actuator has means which yields after the part has been brought into a desired position against the stop, this characteristic of yieldability permitting the power means to operate for a short period of time thereafter, without placing of undue strain upon any of the parts, and assuring that the part which has been moved will consistently be brought into its required position.

It is an object of the invention to provide an actuator of this character having in its power transmission means a part which yields after the moved part has been brought into position against a stop, and a shut off means which acts in response to this yielding to discontinue the operation of the power means after the moved part has reached its required position.

It is an object of the invention to provide a power driven actuator having means acting in response to the overload which is produced when the moved part reaches its required position against a stop to discontinue the operation of the motor after the moved part has been brought into engagement with the stop, thereby assuring that the moved part will be always brought into exactly the position required therefor.

It is an object of the invention to provide an actuator having power means which acts between a yieldable support and a point of application for the power, the reaction against this yieldable support causing its movement in rearward direction when the moved part has been brought into position against the stop, there being a control which acts in response to this reverse or reactionary movement of the support to then effectuate discontinuation of the operation of the power means. It is also an object of the invention to provide an actuator having a screw member adapted to be attached to a part to be moved and having a second screw member in threaded engagement with the first screw member, rotation of the second screw member causing axial movement of the screw member and the part to which it is connected, the device also having yieldable means for holding the second screw member against axial movement during the normal operation of the actuator, and a control means which acts in response to reverse or reactionary movement of the second screw member to stop the motor in response to this reactionary movement of this second screw member when the first screw member is held against further movement as the result of the moved part's reaching its required position determined by a suitably placed stop.

An object of the invention is to provide a device embracing any one of the characteristics set forth in the foregoing wherein a part may be moved forwardly and rearwardly between two positions predetermined by stops, wherein the power means is actuated after the moved part has reached either of the stops, there being incorporated therein a yieldable element which yields during the operation of the power means after the moved part has engaged either of the stops, in association with a control for the power means which operates after yielding of the yieldable means has occurred.

Further objects and advantages of the invention will be brought out in the following part of the specification.

Referring to the drawings which are for illustrative purposes only,

Fig. 1 is a schematic view showing my invention employed for the opening and closing of a butterfly valve in a duct.

Fig. 2 is an enlarged sectional view of the actuator.

Figure 3:
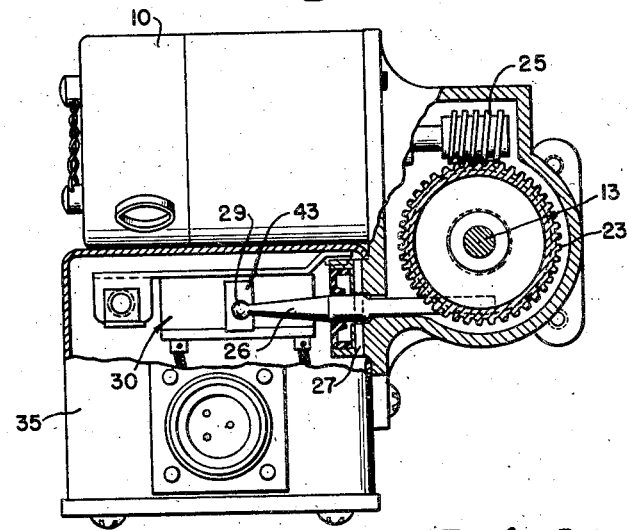
Fig. 3 is a section taken substantially as indicated by the line 3—3 of Fig. 2.

In Fig. 1 of the drawings I show a duct 1 representative of an air duct in an aircraft. To close the duct 1, there is a butterfly valve 2 which swings on a shaft 3. A lever 4 is connected to the valve 2, to provide a means of attachment for the front member 5 of an actuator 6, one end of which is connected by means of a bolt 7 to a stationary support 8 forming a part of the aircraft structure. The actuator 6 includes a hollow body or housing 9 containing suitable transmission mechanism which receives power from a motor 10 and produces axial movement of the front member 5 which normally comprises a screw as will be hereinafter described.

The valve 2 is shown in closed position in the duct 1, this closed position being determined by the valve 2 coming into engagement with a stop which consists of the portion 11 of the duct wall. To open the valve 2, the actuator 6 pulls upward on the lever 4 to swing the valve 2 in counterclockwise direction into open position indicated by dotted lines 2', at which time the lever 4 engages a stop 12.

Referring to Fig. 2, it will be perceived that the actuator 6 includes a second screw member 13 having external threads to engage the internal threads of the thrust bar or screw member 5. Rotation of the screw member 13 will produce axial movement of the screw member 5 in view of the fact that this member 5 is held from axial rotation by its pivotal engagement with the lever 4. The screw member 5 is guided by a sleeve 14 which projects from the shell 9 of the actuator. The inner end of the screw member 13 is supported by spaced bearings 15 and 16, each of which consists of an outer race 17 and an inner race 18. The screw member 13 is axially slidable in the inner races 18. The collar or wheel 19 is fixed on the inner portion of the screw member 13 between the bearings 15 and 16 in spaced relation thereto, and yieldable means 20 and 21 are disposed between the inner races 18 and the bearings 15 and 16 and the opposing end faces or shoulders of the collar 19, these yieldable means 20 and 21 resisting axial movement of the screw member 13 in either direction.

The yieldable means 20 and 21 each comprise a group of dished washers 22 disposed in side by side relation as shown so that when axial pressure is applied thereto, the respective washers 22 will flatten. The washers are of such strength that they will not yield materially under the load applied to the screw member 13 during movement of the valve 2 from one position to another, but are of such strength that when axial movement of the screw member 5 is stopped as the result of engagement of the valve 2 with the stop 11 or engagement of the lever 4 with the stop 12, the action of the threaded engagement between the screw members 5 and 13 will result in a reactionary movement of the collar 9 and the screw member 13 which is permitted by yielding of one or the other of the yieldable means 20 or 21. When the screw member 5 is moving axially outward, the reaction of the force which the member 5 exerts against the lever 4 will be taken by the yieldable means 20, and when the screw member 5 is moving inward, a reaction of the collar 19 against the yieldable means 21 will be produced.

The collar 19 has a gear 23 formed thereon and adjacent this gear there is an annular channel 24. The motor 10 drives a worm 25 which engages the gear 23 and thereby rotates the collar 19 and the screw member 13. A fulcrumed lever 26, having a ball on either end, is supported on a pivot 27 in such position that the ball 28 on its inner end will lie in the channel 24 of the collar 19. Accordingly, axial movement—reactionary movement—of the collar 19 from the centralized position in which it is shown in Fig. 2 will cause the lever 26 to swing in a direction determined by the direction of the reactionary movement of the collar 19. The outer end of the lever 26 projects into a switch box and the ball 29 on its outer end lies between cut off switches 30 and 31 which are swingably mounted on pivots 32 so that these cut off switches 30 and 31 may be swung toward or away from the ball 29 for purpose of adjustment of the position of the ball 29 required to actuate the respective switches 30 and 31. The switches 30 and 31 are small snap switches, this type of switch being preferable in view of the instantaneous opening and closing movement of the contacts. The lever 26 and the switches 30 and 31 form part of a control means for the power means represented by the motor 10. This adjustment of the switches 30 and 31 is accomplished by adjusting screws 33 and springs 34 placed in the manner shown. Each screw 33 passes through an opening in the switch box 35 and has threaded engagement with a nut 36 located at the end of the structure of the switch 30 or 31 opposite its associated pivot 32, and each spring 34 is placed around the screw 33 between the nut 36 and the wall of the casing so as to resiliently force the associated switch inward to the limit permitted by the adjustment of the screw. A feature of this construction is that the switches 30 and 31 are yieldably mounted so that they may be swung outwardly should there be an overtravel of the ball 29 at any time; thereby avoiding injury to a switch as a result of such overtravel.

Figure 4:
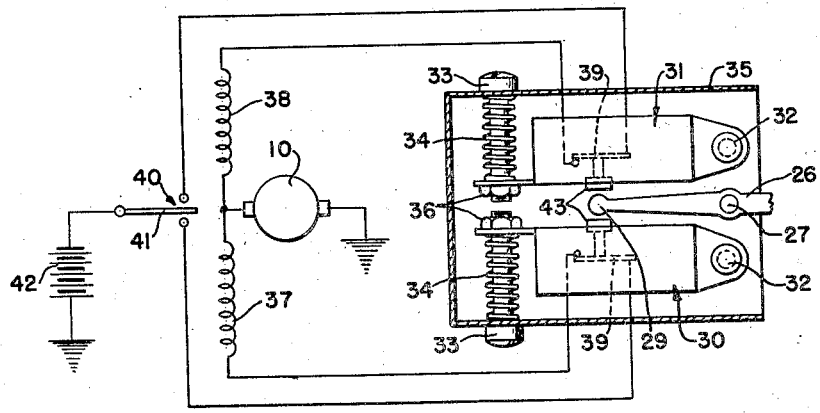
Fig. 4 is a diagram of the wiring.

The motor 10 is diagrammatically shown in Fig. 4 as being of reversible type having forward and reverse windings 37 and 38 disposed in series with the contacts 39 of the switches 30 and 31. A main control switch 40 is provided having a swinging contact 41 which is connected to a source of electrical energy represented by a battery 42; when it is desired to operate the actuator so as to move the thrust member 5 outward, the switch member 41 is moved downward so as to energize the motor 10 through its forward winding 37. When the axial movement of the member 5 is stopped, as a result of the engagement of the valve 2 with the stop 11, the continued operation of the motor 10 will result in a reactionary movement of the collar 19 in a direction to swing the lever 26 in counterclockwise direction, with the result that the ball 29 will engage the button 43 of the snap switch 30 and will actuate this snap switch 30 by opening its contact 39, thereby cutting off the flow of current through the forward winding 37. Upward movement of the switch member 41 will energize the motor 10 through the contacts 39 of the switch 31 and the reverse winding 38, thereby producing a rotation of the motor which will drive the screw member 13 in a direction to move the member 5 upward so as to carry the valve 2 into open position and to bring the lever 4 into engagement with the stop 12 at which time the continued operation of the motor will produce a reactionary movement of the collar 19 in downward direction so as to swing the lever 26 counterclockwise to actuate the switch 31 by opening its contacts 39, thereby cutting off the flow of current through the motor 10. It will be noted that in the normal operation of the device, the motor is not stopped until after the member 2 has been moved fully into the position selected therefor, such position being determined by the utilized stop 11 or 12. Since the motor is not shut off until after the member 2 reaches its desired position and an overload is produced, any production of an overload through stopping of the member 5—for example, as the result of some inadvertent obstruction—will stop the motor and thereby prevent injury to it which would be caused by continued operation under overload.

I claim as my invention:

1. In an actuator for moving a part into a prescribed position: a first screw member having connection to said part; a second screw member engaging said first screw member so that relative rotation of said screw members will produce operative movement of said first screw member, said second screw member having a rearwardly faced shoulder; bearing means supporting said second screw member so that it may have rotary and axial movement; power means for rotating said second screw member; yieldable thrust means engaging said shoulder and resisting rearward movement of said second screw member under normal load applied thereto, said thrust means permitting rearward axial movement of said second screw member when an overload is applied thereto as the result of said part's reaching its prescribed position; and means actuated by said rearward axial movement of said second screw member to stop the operation of said power means.

2. In an actuator for moving a part into a prescribed position: a first screw member having connection to said part; a second screw member engaging said first screw member so that relative rotation of said screw members will produce operative movement of said first screw member, said second screw member having a rearwardly faced shoulder; bearing means supporting said second screw member so that it may have rotary and axial movement; power means for rotating said second screw member; yieldable thrust means engaging said shoulder and resisting rearward movement of said second screw member under normal load applied thereto, said thrust means permitting rearward axial movement of said second screw member when an overload is applied thereto as the result of said part's reaching its prescribed position; a control member which is moved through a path of movement in response to said rearward axial movement of said second screw member; and control means for said power means having a control circuit with a control switch therein for stopping the action of said power means, said switch being adjustable along said path of movement of said control member so that said switch may be adjusted into a position wherein it will be actuated by said control member when the same reaches a selected position, and means for adjusting said switch into different positions along said path of movement.

3. In an actuator for moving a part into a prescribed position: a first screw member having connection to said part; a second screw member engaging said first screw member so that relative rotation of said screw members will produce operative movement of said first screw member, said second screw member having a rearwardly faced shoulder; bearing means supporting said second screw member so that it may have rotary and axial movement; power means for rotating said second screw member; yieldable thrust means engaging said shoulder and resisting rearward movement of said second screw member under normal load applied thereto, said thrust means permitting rearward axial movement of said second screw member when an overload is applied thereto as the result of said part's reaching its prescribed position; a control member which is moved through a path of movement in response to said rearward axial movement of said second screw member; control means for said power means having a control circuit with a control switch therein for stopping the action of said power means; and means for yieldably supporting said switch in the path of movement of said control member so that it will bodily yield without injury thereto should said power means continue to operate for a short period of time after said switch is actuated.

4. In an actuator for moving a part into a prescribed position: a first screw member having connection to said part; a second screw member engaging said first screw member so that relative rotation of said screw members will produce operative movement of said first screw member; power means for rotating said second screw member; spaced bearings supporting the rearward end of said second screw member for rotary and axial movement; a collar fixed on said rearward end of said second screw member between said bearings and in spaced relation thereto; thrust springs in the spaces between said collar and said bearings to resist axial movement of said second screw member under normal axial load applied to said second screw member and yielding under axial overloads applied to said second screw member to permit axial movement of said second screw member and said collar; a control member moved by said axial movement of said collar; and electrical control means for said power means including a pair of shut off switches disposed on opposite sides of said control member so that one of said switches will be actuated by movement of said control member in one direction and the other of said switches will be actuated by movement of said control member in the opposite direction, to stop the operation of said power means.

5. In an actuator for moving a part into a prescribed position: a first screw member having connection to said part; a second screw member engaging said first screw member so that relative rotation of said screw members will produce operative movement of said first screw member; power means for rotating said second screw member; spaced bearings supporting the rearward end of said second screw member for rotary and axial movement; a collar fixed on said rearward end of said second screw member between said bearings and in spaced relation thereto; thrust springs in the spaces between said collar and said bearings to resist axial movement of said second screw member under normal axial load applied to said second screw member and yielding under axial overloads applied to said second screw member to permit axial movement of said second screw member and said collar; a control member moved by said axial movement of said collar; and electrical control means for said power means including a pair of snap shut off switches disposed on opposite sides of said control member so that one of said switches will be actuated by movement of said control member in one direction and the other of said switches will be actuated by movement of said control member in the opposite direction, to stop the operation of said power means, said snap switches being supported so as to bodily yield when the operation of said power means is continued after the actuation of said switches.

6. In an actuator for moving a part into a prescribed position, the combination of: a first screw member having means for connecting it to said part; a shell having spaced walls supporting spaced bearings; a second screw member disposed in projecting relation to said shell and being supported for rotary and axial movement in said spaced bearings, said second screw member being in threaded engagement with said first screw member; a collar on said second screw member between said bearings; a spring between said collar and one of said bearings for resisting axial movement of said second screw member and enabling a reactionary axial movement of said second screw member when said part reaches said prescribed position thereof; power means engaging said second screw member to rotate the same; a control member which is moved through a path of movement in response to said reactionary movement of said second screw member; and control means for said power means having a control circuit with a control switch therein for operation by said control member to stop the action of said power means, a support on said shell along the path of movement of said control member, means for movably attaching said switch to said support so that it will lie in the path of movement of said control member, a resilient member on said support urging said switch toward said control member, and a stop for limiting the movement of said switch toward said control member, said resilient member enabling said switch to be moved bodily by said control member by operation of said power means after the operation of said switch by said control member.

7. In an actuator for moving a part into a prescribed position, the combination of: a first screw member having means for connecting it to said part; a shell having spaced walls supporting spaced bearings; a second screw member disposed in projecting relation to said shell and being supported for rotary and axial movement in said spaced bearings, said second screw member being in threaded engagement with said first screw member; a collar on said second screw member between said bearings; a spring between said collar and one of said bearings for resisting axial movement of said second screw member and enabling a reactionary axial movement of said second screw member when said part reaches said prescribed position thereof; power means engaging said second screw member to rotate the same; a control member which is moved through a path of movement in response to said reactionary movement of said second screw member; and control means for said power means having a control circuit with a control switch therein for operation by said control member to stop the action of said power means, a support on said shell along the path of movement of said control member, pivot means swingably supporting said switch on said support so that it may swing in said path of movement toward and away from said control member, a resilient member on said support urging said switch toward said control member, and an adjustable stop for limiting the distance said switch may swing toward said control member on said pivot means, said resilient member enabling said switch to be moved bodily by said control member by operation of said power means after the operation of said switch by said control member.

8. In an actuator for moving a part into a prescribed position, the combination of: a first screw member having means for connecting it to said part; a shell having spaced walls supporting spaced bearings; a second screw member disposed in projecting relation to said shell and being supported for rotary and axial movement in said spaced bearings, said second screw member being in threaded engagement with said first screw member; a collar on said second screw member between said bearings; a gear on said collar; a spring between said collar and one of said bearings for resisting axial movement of said second screw member and enabling a reactionary axial movement of said second screw member when said part reaches said prescribed position thereof; power means carried by said shell and having a gear element engaging said gear, for rotating said second screw member; a control member which is moved through a path of movement in response to said reactionary movement of said second screw member; and control means for said power means having a control circuit with a control switch therein for operation by said control member to stop the action of said power means, a support on said shell along the path of movement of said control member, means for movably attaching said switch to said support so that it will lie in the path of movement of said control member, a resilient member on said support urging said switch toward said control member, and a stop for limiting the movement of said switch toward said control member, said resilient member enabling said switch to be moved bodily by said control member by operation of said power means after the operation of said switch by said control member.

9. In an actuator for moving a part into a predetermined position: a first screw member connected to said part; a second screw member engaging the first screw member so that relative rotation of said members will produce operative movement of said first member; means supporting said second screw member so that it may have rotary and axial movement; power means for rotating said second screw member; yieldable thrust means; an operable connection between the thrust means and second screw member whereby said thrust means will resist axial movement of the second screw member under normal loads and will permit axial movement of said second screw member when an overload is applied thereto; and means actuated by said axial movement of the second screw member to stop the operation of said power means.

JAMES E. CHAPMAN.